March 29, 1932. F. C. PALAZZO ET AL 1,851,210
PROCESS FOR PRODUCING MIXTURES OF MONO-CALCIUM AND DI-CALCIUM PHOSPHATES
Filed July 19, 1929
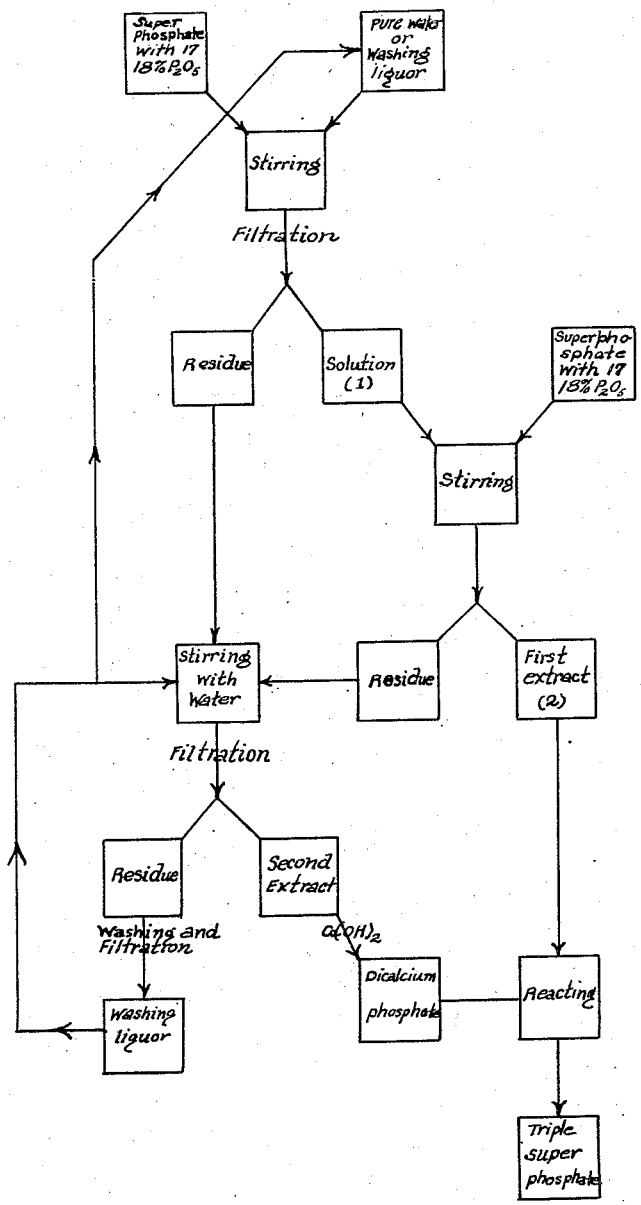
(1) Denotes Specific Gravity 1.25
(2) Denotes Specific Gravity 1.30
INVENTOR.
F. C. Palazzo
BY Marks & Clerk
ATTORNEYS.

Patented Mar. 29, 1932

1,851,210

UNITED STATES PATENT OFFICE

FRANCESCO CARLO PALAZZO AND FORTUNATO PALAZZO, OF FLORENCE, ITALY

PROCESS FOR PRODUCING MIXTURES OF MONO-CALCIUM AND DI-CALCIUM PHOSPHATES

Application filed July 19, 1929, Serial No. 379,572, and in Italy July 30, 1928

The manufacture of monocalcium phosphate or superphosphates having 48–51 per cent. of available entirely or partially water soluble-phosphoric anhydride, by the process according to the present invention, may be made independent from the production of phosphoric acid proper such as hitherto deemed necessary for obtaining the highest percentage of phosphoric anhydride. In the present improved process common superphosphate is used as the starting material.

The monocalcium phosphate obtained by the present process from aqueous extracts of ordinary superphosphates, as well as the various mixtures of mono- and dicalcium phosphate are not obtained, however, by simple evaporation of said extracts. By reason of the comparatively small solubility of the monocalcium phosphate, the mere evaporation of the said aqueous extracts from superphosphate would be excessively costly, nor could it result in products with good qualities because the residue of evaporation not only would comprise monocalcium phosphate, but would inevitably contain a certain quantity of free phosphoric acid.

Both these disadvantages are removed by extracting superphosphate according to the present invention and utilizing the extracts in other ways than by simple evaporation.

Substantially the present invention is based upon the known reaction between phosphoric acid and dicalcium phosphate conducing to the formation of monocalcium phosphate, namely

$$H_3PO_4 + CaHPO_4 = Ca(H_2PO_4)_2$$

Ordinary superphosphate is therefore subjected to such treatments as to obtain from the same superphosphate the two substances required for the reaction.

It is well known that generally under the conditions chosen for decomposition of phosphate rock sulphuric acid is always used in a certain excess over the quantity strictly necessary for the formation of monocalcium phosphate, and therefore, since in every superphosphate, save cases of exception, free phosphoric acid is always contained, in the products which are not treated in the proper way and which are not improved, such quantity of free phosphoric acid may be so large as to form a substantial part of the total phosphoric anhydride. This percentage of free phosphoric acid in the superphosphates is utilized according to our present invention.

By the water lixiviation of ordinary superphosphate with a comparatively high or medium percentage of free phosphoric acid two different types of aqueous extracts are obtained, namely: a highly concentrated extract characterized in that it is saturated with monocalcium phosphate and furthermore contains a great quantity of free phosphoric acid, and an extract of low concentration only possessing a small proportion of free phosphoric acid and a total content of phosphoric anhydride-free acid and monocalcium phosphate—, which will be lower than that corresponding to a saturated solution of monocalcium phosphate.

From the latter extract containing but a small quantity of free or bound phosphoric anhydride, and the evaporation of which would be comparatively costly, the phosphoric acid is precipitated by the addition of milk of lime in the form of dicalcium phosphate, which later on will be caused to react with the first highly concentrated extract whereby the dicalcium phosphate is converted to monocalcium phosphate, which together with the monocalcium phosphate already present in the first extract may be obtained at low cost by drying the pasty reaction mass in a vacuum drier.

Obviously the nature of the final product depends on the quantity in which the precipitated dicalcium phosphate reacts with the total quantity of the first extract. If the proportion between the free phosphoric acid of the first extract and the precipitated dicalcium phosphate is kept up, which proportion corresponds to the above equation, a final product mainly comprising monocalcium phosphate is obtained. If on the other hand the quantity of free phosphoric acid of the first extract is lower than the quantity corresponding to the above equation, the final product instead of only comprising monocalcium phosphate consists of a mixture of monocalcium- and dicalcium phosphate.

*Example.*—Ordinary superphosphate obtained by the usual methods from phosphate rock and sulphuric acid, but advantageously keeping up such proportions that the superphosphate has a comparatively high percentage of free phosphoric acid, is brought into contact, at ordinary temperature, with a quantity of water corresponding to one half of its weight. After vigorous stirring for about one hour the liquid is separated from the undissolved residue with the aid of a rotary cellular filter. The extract thus obtained, having a specific gravity not less than 1.23, or a higher specific gravity when using a superphosphate of a higher percentage than 14–15 per cent. (for instance 1.25 for superphosphate of 17–18 per cent.) is again brought in contact with a quantity of fresh superphosphate equal to that of the extract. After vigorous stirring for about one hour also the new paste is treated in rotary cellular filters or decanters or separators for rapidly recovering the greater part of the new solution (first extract).

This solution ordinarily has a specific gravity not less than 1.30 and a total percentage of phosphoric anhydride not less than 23 per cent. Both these values may be higher when using superphosphates having a higher content of free phosphoric acid than usual, for instance superphosphates with 8–9 per cent. of free phosphoric acid.

The undissolved residues of the above described two steps of treatment are united to a single mass and then subjected, with stirring, to a fresh lixiviation with water, whereby a new extract (second extract) is formed, while the undissolved residue is thoroughly washed out with water in a rotary cellular filter. In the said washing care is taken that the resulting washing liquor has approximately the same volume as that used at the beginning of the lixiviation of the first charge of superphosphate, because, once the process is started, the first treatment of raw superphosphate instead of being carried out with pure water is carried out with this washing liquor, while the liquid (second extract) from the second lixiviation of the superphosphate is utilized for the production of dicalcium phosphate. For this purpose we gradually add to the second extract, always stirring vigorously, the required quantity of milk of lime, and the precipitate obtained in this way is separated from the greater part of the liquid by decantation then centrifuging and then washed out, in the same centrifuge, with a small quantity of water, the washing liquor thus obtained being afterwards utilized for preparing the milk of lime. For the reaction with phosphoric acid, that is with the first extract which besides free phosphoric acid contains monocalcium phosphate, the dicalcium phosphate obtained from the second extract is dehydrated at low temperature in a vacuum apparatus and thereupon so stirred in suitable proportion with the first extract as to form a pasty mass. After a rest of some hours the paste is brought to complete dryness at a temperature of about 50° C. in a vacuum apparatus, and when discharged from the said apparatus the solid product is powdered or finely granulated.

The proportion between dicalcium phosphate and free phosphoric acid in the first extract may be chosen at will so as to obtain as final product either a phosphate with a high percentage of phosphoric anhydride of a mixed character, that is containing besides monocalcium phosphate a certain quantity of dicalcium phosphate soluble in neutral ammonium citrate, or a phosphate with phosphoric anhydride completely soluble in water, that is substantially monocalcium phosphate.

In the latter case usually a certain quantity of precipitated dicalcium phosphate remains available. This excess of dicalcium phosphate which is not utilized for obtaining other products but directly put on the market as phosphatic manure, need not be completely dried, but a moderate drying of the product will be sufficient, the greater part of the crystallization water remaining in the product. Under these circumstances the percentage of phosphoric anhydride is still very high, about 38 per cent., while its solubility in neutral ammonium citrate is quite satisfactory.

On the attached flow sheet the steps of the process are clearly illustrated.

Having now particularly described and ascertained the nature of our said invention and in what manner the same is to be performed, we declare that what we claim is:—

1. Process for the production of monocalcium phosphate, consisting in first preparing a concentrated aqueous extract of superphosphate containing free phosphoric acid, separating the undissolved residue therefrom, preparing a second aqueous extract of the said undissolved residue, treating the said second extract with milk of lime to precipitate the phosphoric content of free acid and monocalcium phosphate, as dicalcium phosphate and treating the first concentrated extract with the said precipitated dicalcium phosphate after drying the latter, whereby the free phosphoric acid content of the first extract is converted into monocalcium phosphate thus adding to that already contained in the first extract.

2. A process as described in claim 1 in which said aqueous extract is prepared from superphosphates of calcium rich in free phosphoric acid.

3. A process as described in claim 1 in which the milk of lime required for precipitation of the dicalcium phosphate is prepared from the washing liquors resulting from the washing of the precipitated dicalcium phosphate.

4. A process as described in claim 1 consisting in using for the extraction operation the liquors resulting from the washing of the undissolved residues of the extraction of the superphosphates.

FRANCESCO CARLO PALAZZO.
FORTUNATO PALAZZO.